(12) United States Patent
Surintrspanont

(10) Patent No.: US 6,525,660 B1
(45) Date of Patent: Feb. 25, 2003

(54) INTERACTIVE FOOD PACKAGING

(75) Inventor: Singhachai Surintrspanont, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/672,002

(22) Filed: Sep. 29, 2000

(51) Int. Cl.⁷ ............................................... G08B 13/14
(52) U.S. Cl. ................................... 340/572.1; 235/375
(58) Field of Search .......................... 340/572.1, 572.3; 235/375, 380, 383

(56) References Cited

U.S. PATENT DOCUMENTS

| | | | | |
|---|---|---|---|---|
| 4,544,590 A | * | 10/1985 | Egan | 428/41.4 |
| 4,791,281 A | * | 12/1988 | Johnsen et al. | 705/14 |
| 4,840,602 A | | 6/1989 | Rose | 446/175 |
| 4,914,748 A | | 4/1990 | Schlotter, IV et al. | 362/109 |
| 5,021,878 A | | 6/1991 | Lang | 358/93 |
| 5,142,803 A | | 9/1992 | Lang | 40/411 |
| 5,330,380 A | | 7/1994 | McDarren et al. | 446/397 |
| 5,433,035 A | | 7/1995 | Bauer | 40/124.1 |
| 5,478,989 A | * | 12/1995 | Shepley | 235/375 |
| 5,480,156 A | | 1/1996 | Doederlein et al. | 273/237 |
| 5,796,328 A | | 8/1998 | Golant | 340/384 |
| 5,841,115 A | * | 11/1998 | Shepley | 235/375 |
| 5,897,522 A | | 4/1999 | Nitzan | 604/20 |
| 5,954,640 A | * | 9/1999 | Szabo | 600/300 |
| 6,024,281 A | * | 2/2000 | Shepley | 235/375 |
| 6,062,936 A | | 5/2000 | Rudell et al. | 446/71 |
| 6,102,162 A | * | 8/2000 | Teicher | 186/39 |
| 6,195,006 B1 | * | 2/2001 | Bowers et al. | 340/572.1 |

FOREIGN PATENT DOCUMENTS

| | | |
|---|---|---|
| FR | 2 717 158 | 9/1995 |
| WO | WO 94/29805 | 12/1994 |

\* cited by examiner

*Primary Examiner*—John Tweel
(74) *Attorney, Agent, or Firm*—Winston & Strawn

(57) ABSTRACT

The invention provides a food product for delivering an audible, visual and/or tactile message to a consumer of the food product. The food product contains a food packaging component; a tag having encoded information associated with the food packaging component; and a separate reader for translating the encoded information into an audible, visual and/or tactile message. This message may be obtained before, during or after consuming the food product.

29 Claims, 5 Drawing Sheets

INTERACTIVE FOOD PACKAGING

FIELD OF THE INVENTION

This invention relates to the field of interactive food packaging. In particular, this invention relates to packaging associated with food, particularly confectionary and ice cream-type treats, wherein a device associated with the packaging, either alone or optionally with a reader interactable with the device associated with the packaging, provides when activated a light, text, sound, or movement output that is detectable by a consumer.

BACKGROUND OF THE INVENTION

Collectible items, such as toys, cards, and the like, have often been used to enhance consumer identification with and preference for a consumer product. Food manufacturers and retailers have responded to this popularity by introducing innovations such as more complex toys, holographic logos on cards, and with toys tied to other advertising venues, for example movie action figures. Cards have typically been passive. Toys are interactive but typically are not related with the products they promote.

Efforts have been made to improve the level of interaction between a consumer and a card. U.S. Pat. Nos. 5,480,156 and 5,433,035 disclose talking trading cards which are activated by either squeezing the card or touching a front surface of the card. Children's books have become available which contain integral electronic devices capable of producing sounds that had been stored in a digital memory within the device during the manufacturing process, either as digitally recorded or synthesized sound. Examples of such books are the SIGHT-N-SOUND books published by Western Publishing and widely available in toy stores and at other merchandisers in the United States and elsewhere. In these books, an electronic device is attached to the back cover. This device allows the reader to press any one of several touch button switch areas located on the device, which in turn results in the production of a particular prestored sound, such as that of a human voice, an animal sound, musical instrument sounds and the like. When the child reads the book or has the book read to him or her, graphics or colored indications within the text direct the reader to press similarly identified or colored touch buttons on the device; thereby to reproduce an appropriate, prestored sound to enliven and otherwise enhance the process of reading the book. In these toys, the entire interactive sound-generating system is self-contained within the toy.

Innovision-Group has been manufacturing first toys that interact with another reader-toy, where the reader toy conveys a message based on machine-readable information contained on the first toys.

During the last several years, various child-oriented products have been developed which incorporate electronic circuitry for providing audible sounds or messages. Typically, these prior art sound producing toys are in the form of puzzles, display boards, or panels which enable certain sounds to be made when either a puzzle piece or a movable member is positioned to activate the system to produce the particular sound or message. For example, U.S. Pat. No. 5,330,380 is directed to an audible message/information delivery system. In particular, the patent discloses a system comprising a speaker, processing means, an activating switch, a microprocessor, and an input zone for reading coded information disposed on a toy selected from the group consisting of toy vehicles, dolls, stuffed animals, airplanes and action figures. When a user places a toy bearing a coded message on the input zone of the system, the system will play back an audible message associated with that toy.

In addition, numerous toy dolls have been manufactured and sold over the last several years which incorporate circuitry for enabling the doll to enunciate messages, whenever activated. Such dolls have also been constructed with removable or replaceable sound producing chips in order to increase the vocabulary which the doll is capable of providing. U.S. Pat. No. 4,840,602 to Rose describes a talking doll responsive to an external signal, in which the doll has a vocabulary stored in digital data in a memory which may be accessed to cause a speech synthesizer in the doll to simulate speech. U.S. Pat. No. 5,021,878 to Lang describes an animated character system with real-time control. U.S. Pat. No. 5,142,803 to Lang describes an animated character system with real-time control.

U.S. Pat. No. 4,914,748 discloses a novelty flashlight which illuminates a piece of candy when the end user depresses a button on a handle of the device.

U.S. Pat. No. 6,062,936 describes a toy that includes a first electrode and a second electrode that are coupled to an electrical circuit. The first electrode is also coupled to an consumable substance. The circuit is closed when an end user becomes electrically coupled to the first electrode and the consumble substance. Closing the circuit may activate one or more actuators, sound devices, etc. of the toy.

Food packaging material are used to contain a wide variety of information regarding contents, expiration date of goods, ingredients of contents, safety, use of goods and the like is generally printed on labels which are easily read visually.

Food packaging material are typically sterile, and any associated items are advantageously small, light, and fit for contact with food. The traditional talking card or toy, with a battery, a microprocessor or sound chip, and a speaker of sorts, is therefore undesirable for use on food packaging.

Further, if a toy or card were to be associated with various food products, it must be able to withstand temperature extremes. For ice cream products and the like, temperatures of −40° C. is common in hardening, and −25° C. is common in storage. The toy or card must be able to withstand these temperature extremes and still be operable after being exposed to these temperatures. This invention described below provides an interactive toy associated with a food product.

SUMMARY OF THE INVENTION

The invention provides a food product for delivering an audible, visual and/or tactile message to a consumer of the food product. The food product contains a food packaging component; a tag having encoded information associated with the food packaging component; and a separate reader for translating the encoded information into an audible, visual and/or tactile message. This message may be obtained before, during or after consuming the food product.

The consumer may obtain the message from the encoded information of the tag by activating the reader to the tag. The reader includes a sensory output mechanism providing one or more of light, displayed text, sound, or movement when the reader is activated to read the encoded information. The light, displayed text, sound, or movement may include information which the consumer then uses to play a game, for example, a URL or number which when the appropriate internet site is accessed allows the consumer to play a game, receive a message, enter a contest, or the like. In one embodiment, information is directly communicable from the reader to a personal computer using any protocol known to those of skill in the art.

In an embodiment wherein at least part of the sensory output is audible, the sensory output mechanism comprises a sound chip that includes a memory for storing a prerecorded message associated with the encoded information; a sound generating unit for audible play-back of the prerecorded message associated with the encoded information; and a mechanism for retrieving from the non-volatile memory the prerecorded message associated with the encoded information.

In an embodiment wherein at least part of the sensory output is visible text, the sensory output mechanism comprises a chip that includes a memory for storing a prerecorded message associated with the encoded information; a liquid crystal display including a controller for displaying the prerecorded message associated with the encoded information; and a mechanism for retrieving from the non-volatile memory the prerecorded message associated with the encoded information.

The reader in one embodiment includes at least one electro-optical sensor capable of reading encoded information on the tag by one or more of visible, ultraviolet and infrared light, or radio wave or microwaves or any other usable portion of the electromagnetic spectrum, by conductivity, or by magnetic field. In a preferred embodiment, the machine-readable information in that tag is contained in a semiconductor chip, and the chip is read by the reader via electromagnetic radiation, i.e., radio or microwave radiation, received by an antenna in the reader. In one embodiment, the machine readable information in the tag is contained in a small semiconductor chip with a small chip-antenna, wherein the chip antenna may include a portion for obtaining power from the reader via moving magnetic fields or the like and another portion of the chip-antenna may include a portion for transmitting the encoded information, and the reader includes a reader-antenna which transmits magnetic fields to the chip and which receives electro-magnetic radiation containing the encoded information.

In another embodiment, the reader comprises a plurality of electro-optical sensors and further includes a housing for supporting the reader.

In one embodiment the housing is advantageously configured as a toy. In a second embodiment the housing is advantageously configured as a point-of-sale marketing tool.

In another embodiment, the reader reads encoded information on the tag by one or more of magnetic switches. In such a case the tag is at least partially magnetized. The reader may include a plurality of magnetic and/or mechanical switches, and wherein the housing comprises at least one slot adapted to receive at least a portion of the food packaging component.

The tag is affixed to the food packaging component and advantageously releases no toxic compounds which may cause injury if ingested.

In some embodiments of the invention, the tag does not contain metal of a quantity sufficient to set off a metal detector.

In some embodiments, the tag is embedded in a stick which may be wood or molded plastic. The stick may be enclosed in the food package component, or attached to the food package component, or attached to the food product.

The food product may contain a plurality of tags and a plurality of different food packaging components, wherein at least two different tags are contained, such that a tag is associated with each different food packaging component, that the reader provides at least two different messages in response to the tags in the food product.

The food packaging component may be a wrapper wherein the tag is disposed upon or affixed to the wrapper, and/or a box for containing a plurality of food products wherein an additional tag is associated with the box. Where the food is in the form of an ice cream product having a stick or wrapper or both, the tag may be associated with either the stick, the wrapper or both.

DETAILED DESCRIPTION OF THE INVENTION

Figure 1:
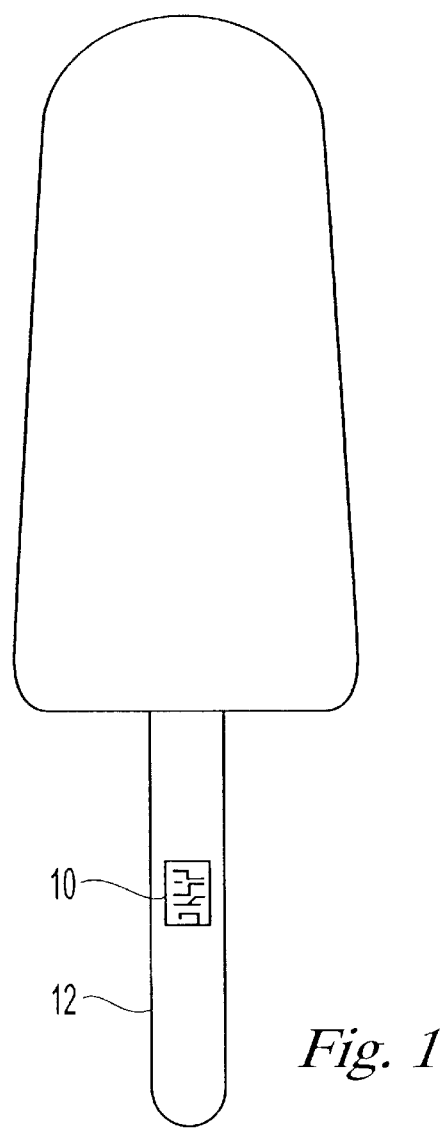
FIG. 1 is a depiction of a tag on a food package.

The invention relates to a system for delivery of an audible, visual, and/or tactile message. This system is associated with a food product, and especially with a food packaging component for the product. This is an interactive system, wherein at least a part of the message or information delivery system is integral with, or attached to, the food packaging component. The interaction between the one or several portions of the system and the consumer result in the desired active output from the system.

The food product can be of any type known to the art. In one embodiment, the food is dairy products. In another embodiment, the food is confectionary products. In yet another embodiment, the food is ice cream-type products, including ice cream, ice milk, flavored ice, and products containing these foods. For dairy products, for example ice cream products, the food packaging component may comprise a stick or a wrapper, such as paper, paper laminated with plastic and/or wax and/or foil, or the like. It is envisioned that the information delivery system can also be used to promote wrapped candy, snacks, drinks, and other foodstuffs associated with consumers, particularly with young consumers.

The audible, visual, or tactile message or information delivery system is in whole or in part associated with the food packaging component. By associated with it is meant that the system, or a part thereof, can be part of the packaging component, can be attached to or on the packaging component, can be contained within the packaging component, and/or can be appended to the packaging component on a box containing a plurality of wrapped food products.

In one embodiment, the overall product box or package includes a self-contained audible message or information delivery system attached thereto. The entire delivery system which will include a power source and at least a light or sound-generating system will be incorporated into the package. Such an embodiment includes a power source, a microprocessor or sound chip, an activator switch, and at least one of a sound, light, or movement-generating component. In this embodiment, the system is activated by touching or otherwise manipulating a certain portion of the package.

In a preferred embodiment, the packaging component contains, or is attached to, or is appended to, only a part of the audible message or information delivery system. In a most preferred embodiment, the part of the system associated with the food packaging component is a tag. There is a separate reader part of the system for interacting with the tag.

In a one embodiment, wherein a plurality of packaged food comes in a box, a tag is attached to the box as well as to the food packaging component(s). This tag may be painted or glued or otherwise affixed to the packaging component. In another embodiment, the tag is integral to the packaging component. In another embodiment, the tag is contained in the packaging component.

There are various health and regulatory concerns associated with placing some of the components of an interactive toy on food products. One particular concern is incorporating a battery in with food products. Also, the size of the toy associated with the food product must be small enough to not interfere with manufacturing, storing, shipping, selling, and consuming the food product. These concerns of including a battery and of excess size are eliminated by use of a tag.

The tag contains machine-readable information in the form of, for example, a readable semiconductor chip, spaced physical markers, magnetic markers, or UV, visible, IR, microwave, radio, or other electromagnetic radiation emitters or reflectors. In a particularly advantageous embodiment, the geographic location of these markers, emitters, or reflectors conveys additional meaning, thereby allowing combinations of markers which can convey more information. This machine-readable information is read by a separate reader, and the reader then provides the desired output.

By "machine readable information" or "encoded information" is meant information that is machine readable such as by the electro-optical reading unit of the hand-held reader of the invention. An electro-optical reading unit is a device that can obtain tag information by electromagnetic radiation, for example visible, IR-, or UV-light, radio waves, microwaves, and the like, as well as by magnetic fields.

This machine-readable information in the tag can be stored by electric, magnetic, visible, IR-readable, UV-readable, or other means. In one preferred embodiment, the machine readable information is stored in a semiconductor chip as non-volatile readable memory. The tag in another embodiment is a series of physical bumps that press preselected buttons on the card reader. The tag in yet another embodiment is a transparent portion with electromagnetic absorbers—UV, IR, or visible light—in a preselected pattern. In another embodiment, the tag has magnetic markers in a preselected pattern. In another embodiment the tag may have electromagnetic reflectors in a preselected pattern. In another embodiment, the tag includes electric conductors arranged in a preselected pattern. In yet another embodiment the tag may be a combination of these types.

The encoded information stored as UV, IR, or visible light reflectors or emitters can be read by an electro-optical reading unit that operates in the visible, ultraviolet, or infrared wavelength ranges. Such a tag may be similar to a bar code. The encoded information may be read by an electro-optical reading unit which can operate either within or outside the visible wavelength range.

It is necessary that the encoded information be selected in a format that will be readable by a respective hand-held card reader. By way of example and without limitation, some of the various combinations of light source, appropriate electro-optical reading unit (detector) and the optical response which is monitored are: 1) IR light source, IR light detector measuring differential reflectivity, transmissivity or long wave length fluorescence; 2) visible light source, IR light detector measuring fluorescence; visible light source, visible light detector measuring reflectivity or transmissivity; UV light source, visible light detector measuring fluorescence; or UV light source, UV light detector measuring reflectivity or transmissivity. In such embodiments, the amount of information that can be stored on the tag is limited, often to between about 8 bits to about 64 bits. This is insufficient space to contain a complete message, so the machine-readable information is such a case is typically a code or identifier, wherein the reader correlates the code with a message stored in the reader.

Figure 3:
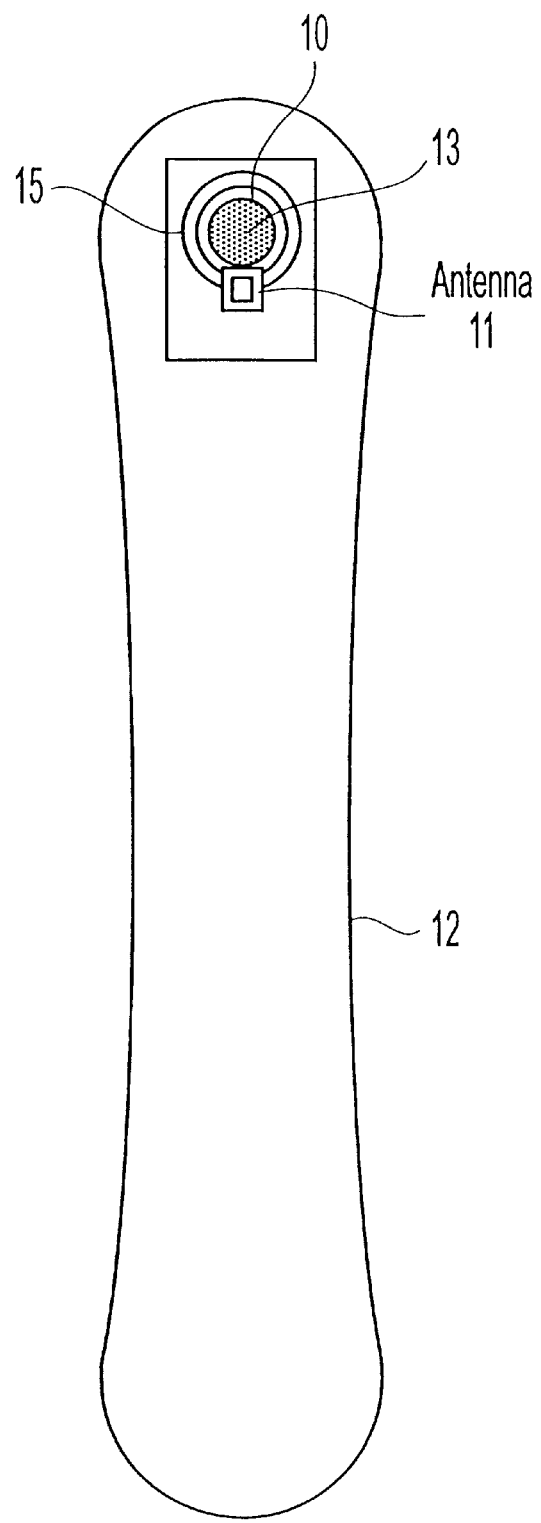
FIG. 3 is a depiction of a tag on a stick included in or attached to a food package.
Figure 5:
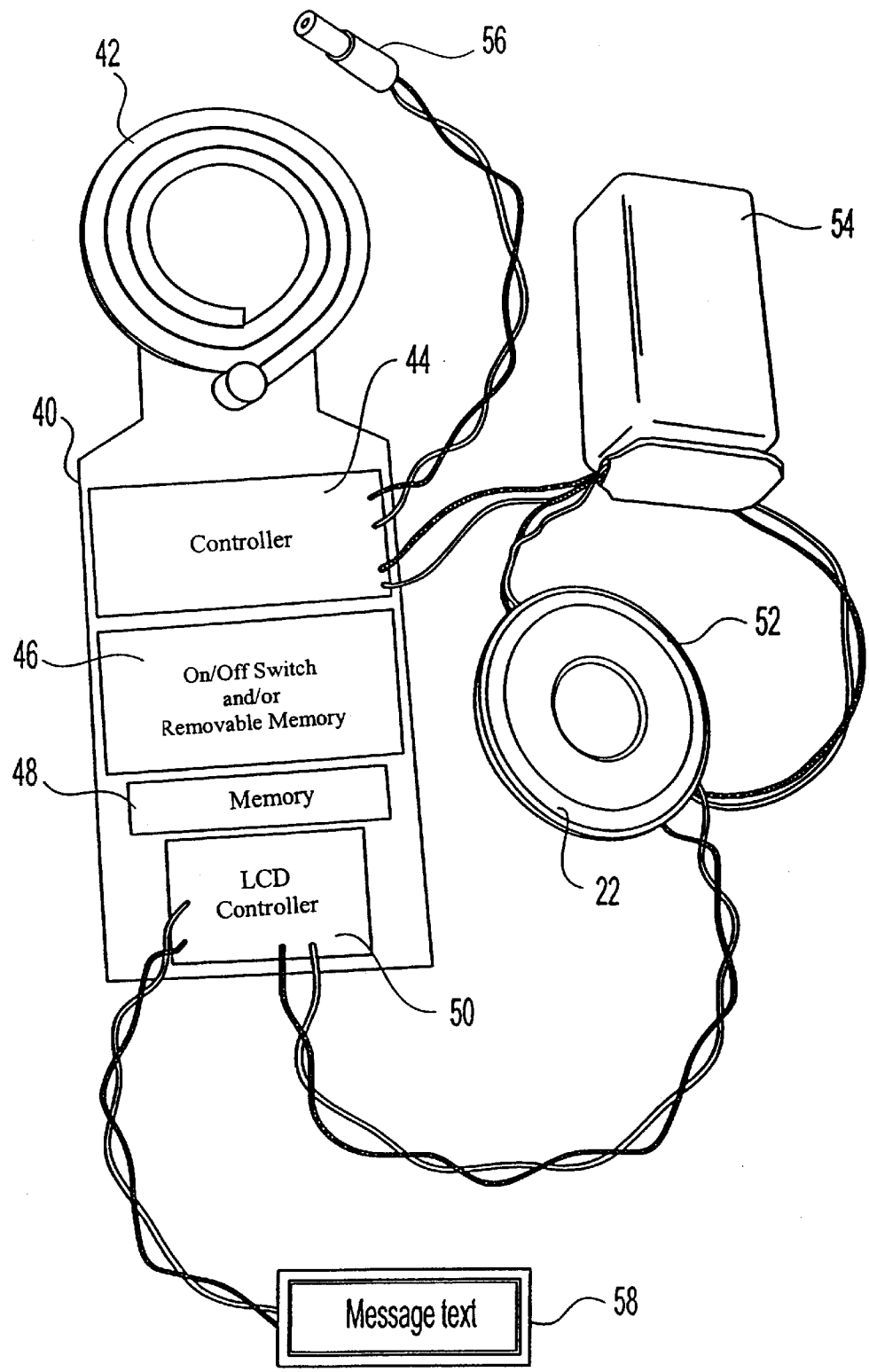
FIG. 5 is a partly schematic illustration of a hand-held reader, constructed and operative in accordance with a preferred embodiment of the present invention.
Figure 6:
FIG. 6 is a toy containing therein a reader with surface or slot (34).

In the embodiment wherein the machine-readable information is stored on a chip such as a readable semiconductor memory chip, as is shown in FIG. 3, the amount of information that may be stored on the tag can range from about 200 bits to about 60000 bits, typically between 1000 bits to 10000 bits. This is sufficient memory for an entire text message, or for a short voice message. In such a case, transmitting the message from the tag to the reader advantageously incorporates an antenna (11) in operable contact with the chip 13, and may include a second antenna (15). In such a case the reader (40), such as is shown in FIG. 5, may utilize an antenna (42), which may be configured to provide power to the tag, to read information transmitted from the tag, and/or to activate the tag. The antenna (42) must be operably attached to a controller (44) and to memory (48). The sensory output in reader (40) includes audible output from a speaker (22), visual output from a liquid crystal display (58), as well as sound chip and liquid crystal display controller (50). A power source (54) is includes. An output (56) which may be communicable directly with a personal computer along a wire interface is provided. There may also be an on-off switch (46) and/or removable memory (46).

In yet another embodiment, the encoded information can employ materials that produce a phosphorescent signal that can be read by the electro-optical reading unit.

The appropriate combination of material used for making the encoded information on a tag and the respective electro-optical sensor will be required. For example, when the encoded information is visible to ultra-violet light, then an electro-optical sensor which senses ultra-violet light will be used. The same is true for all light wavelength ranges and other tag configurations contemplated by the invention and described above.

The message encoded in the tag may be the entire message, wherein bits of information correspond to discrete sound or words. Typically, however, the message will be one of a limited number of discrete values which the reader correlates with or translates into a specific message that is then delivered to the consumer.

It is desirable that the tag release no toxic compounds which may cause injury if ingested, and have a temperature tolerance of at least −50° C. to about 50° C. If the food product is sterilized, or if the tag is imbedded in molten plastic, then the tag should be able to withstand temperatures of between about −50° C. to about 150° C.

The tag itself may be a sticker, paint or glue that contains a readable substance, that is, a visual light, UV, or IR absorbing compound or a magnetic compound or a partially conductive compound. The spacial distribution of the readable substance disposed on the tag is one common method of encoding information on the tag. The information is typically contained in the combination, orientation, or other information included in the tag. The tag may be either visible or invisible to, or imperceptible by, the naked eye. The tag may be an image not normally associated with the encoded information.

The message may be random or which may be specific to the food product that is packaged. The tag can be unique, or particular to the product itself. Several types or classes of food may be tagged, and the output from the hand-held reader is advantageously tailored to the type or class of food.

Tags that can be read without employing lasers are in many instances preferred, as the reader may be a toy. Tags that employ radio waves or low power microwaves are preferred, because more information can be transmitted from the tag to the reader via these mediums.

This two-part system is particularly suited for dairy and ice cream-type products. The ice cream package, or portion thereof or appendage thereon, has information in machine-readable form.

The ice cream is generally checked for metal when the ice cream production is complete to prevent unwanted metal in ice cream products from reaching consumers. Therefore, in some embodiments, the portion of the system associated with the tag should have essentially no metal, that is, no metal of a form that could cause problems if accidently ingested or to be detected by a metal detector. Certain metal types, for example inert metal incorporated into the tag as a magnetic or conductive component of a semiconductor chip or as a pigment are useful in these metal-less tags if not present in quantities sufficient to set off a metal detector designed for food use.

The food packaging contains the tag, which may be a part of the packaging, as a small toy appended to the packaging, or the like, wherein the tag is interactable with the hand-held reader. The tag information is read by an appropriate reader, when activated by the consumer, to produce a desired response which the consumer can sense, thereby heightening the consumer enjoyment and/or recognition of the underlying product.

The encoded information is typically encoded in a binary format; although, other formats are contemplated by the invention.

Figure 2:
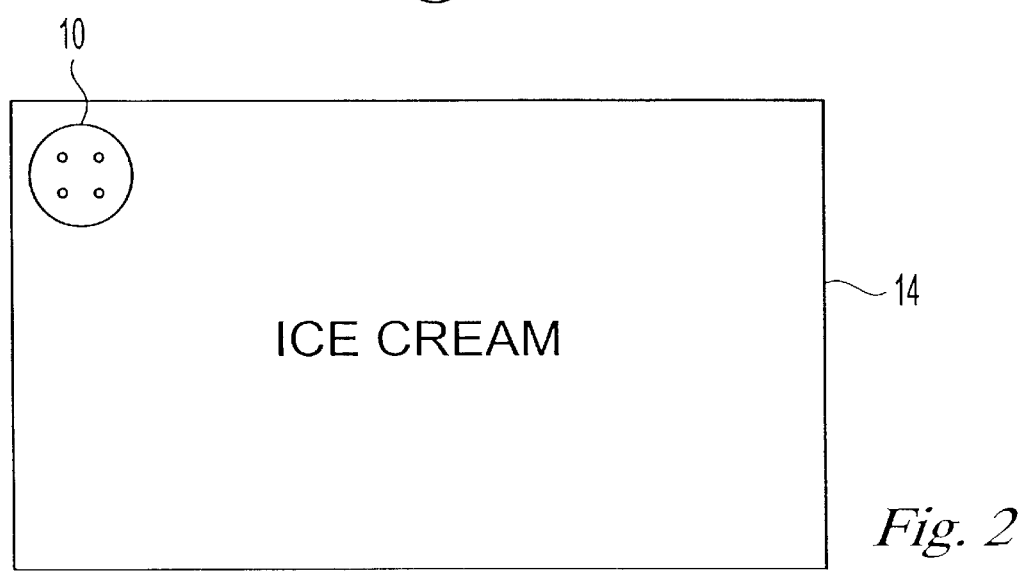
FIG. 2 is a depiction of a tag on a food package.

In the exemplary embodiment shown in FIGS. 1 and 2, encoded information (10) is disposed on a lower portion of the stick (12) or package (14). Encoded information can be laid out in many different configurations. It need not be laid out, as depicted in FIG. 1, in a linear configuration that matches the layout of corresponding electro-optical sensors.

Figure 4:
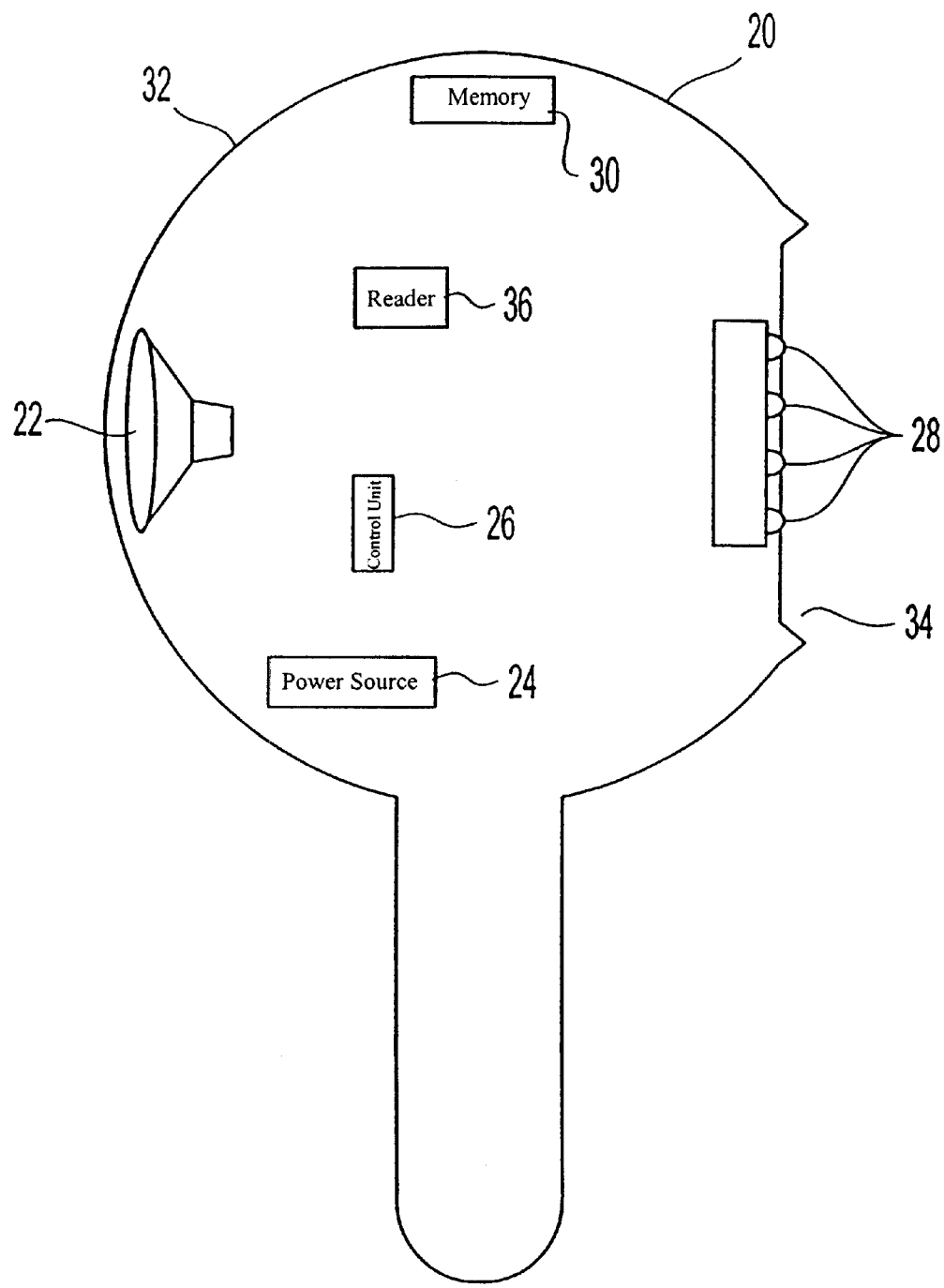
FIG. 4 is a block diagram of a hand-held reader, constructed and operative in accordance with a preferred embodiment of the present invention.

A preferred embodiment comprises, in combination, a tag and a hand-held reader. The hand-held reader (20), as depicted in FIG. 4, comprises at least one of a speaker, text reader, motor, and/or lights (22), an electrical power source (24), a control unit (26), an electro-optical reader (28) for reading the encoded information on the tag, optionally a memory chip, preferably non-volatile memory (30) which may be removable, and a housing (32) within which all of the electronic components of the reader are disposed. The housing (32) can have a slot (34) through which, or a recess (34) into which, or a surface (34) near which the portion of a tag that bears encoded information can be placed and subsequently read by the electro-optical reader.

The hand-held card reader will read the encoded information from the tag and in response generate an audible or other sensory message associated with the image or encoded information on the tag.

Thus, in one embodiment, the present invention is an interactive reading system comprising, in combination: a tag bearing encoded information, wherein the tag is associated with ice cream packaging; and a hand-held reader comprising: a housing having a surface; an electro-optical reading unit disposed adjacent the surface for reading the encoded information on said tag; a sound chip comprising a volatile or, more preferred, non-volatile memory for storing a prerecorded message associated with the image or encoded information borne by said tag; a sound generating unit disposed within the housing for audible play-back of the prerecorded message associated with the image or encoded information borne by said tag; a control unit disposed within the housing and operably connected to said sound generating unit, said electro-optical reading unit and said sound chip for decoding encoded information read by said electro-optical reading unit, for retrieving from said non-volatile memory the prerecorded message associated with the image or encoded information borne by said tag and read by said electro-optical reading unit, and for initiating play-back of the prerecorded message by said sound generating unit; and an activating switch associated with said housing and operably connected to said control unit.

Each hand-held reader, advantageously configured as a toy or as a point-of-sale marketing tool, comprises a power source, such as a battery or a connection to line power. The power source may be rechargeable, disposable, and/or interchangeable. Such source can be an individual battery or plural batteries or a rechargeable electrical power pack. The power source can be disposed anywhere within the housing.

The hand-held reader comprises a housing. The housing advantageously has a slot, recess, or surface for addressing the tag bearing encoded information. When present, the slot in the housing can be adapted to closely fit and receive the portion of the tag which bears encoded information. In some embodiments the surfaces cooperate to receive a tag in a manner to permit reading of encoded information by electro-optical reading unit. The slot, surface, or recess can be disposed anywhere desired in the housing.

Each toy optionally includes an on-off switch. The switch may be activated automatically when a tag is placed in a predetermined location, for example in a slot in the toy adapted to accept the tag. The toy may advantageously also have a time delay so that if un-used for a preselected amount of time, the toy will turn itself off. When desired, the hand-held reader of the invention can comprise an activating switch to initiate reading of encoded information on a tag and play-back of a prerecorded message associated with the encoded information read. Such switches include by way of example and without limitation, any conventional active or passive electrical device capable of conducting a signal in response to the approach or application of an external stimulus such as force, displacement, deformation, pressure, temperature, electromotive potential, electromagnetic radiation or magnetic field.

The reader, especially in those embodiments which provide sound output, comprises memory, preferably non-volatile memory. The memory or a portion thereof may in some embodiments be stored in a sound chip. Such sound chips are capable of storing and independently retrieving numerous messages. The chip typically comprises a microprocessor (typically with ROM) and a randomly accessible sound storage-and-playback memory having addressable storage locations. In one embodiment, the toy will require non-volatile memory for storage of prerecorded messages associated with an individual or particular group of tags. The information stored in the non-volatile memory will be retrievable by a control unit and will be played back by sound generating unit. The non-volatile memory is an integral part of sound chip and can further comprise additional volatile or non-volatile memory which is not an integral part of sound chip. Sound chips comprise a central processing unit or microprocessor and an analog non-volatile memory. Such devices, when coupled with a digital to analog converter, are capable of receiving digital information and storing it in analog format and subsequently retrieving the analog formatted information which is converted by sound generating unit into an audible signal.

The reader can further comprise additional volatile or non-volatile memory which is not part of the sound chip. It is also contemplated that the housing of the card reader can further comprise a removable portion which can house or provide access to removable non-volatile memory and/or sound chips, since the non-volatile memory and sound chips can be permanent components of or can be removable from the card reader. When not an integral part of the sound chip, non-volatile memory contemplated by the invention can be any suitable commercially available non-volatile memory storage device. Such memory units include, by way of example and without limitation, a non-volatile RAM which can be an ultra low-power CMOS SRAM with a long-life lithium power source for 10 year data retention.

The term "non-volatile memory" means that code information in the memory will be retained in the memory unit even if electrical power is temporarily lost. Another type of useful non-volatile memory is the well known electronically programmable read only memory (EPROM). These silicon chips allow the user to load a limited number of bits into a non-volatile memory. Once a bit is loaded, however, it can not be changed, although the bit can be ignored and a new bit can be electronically entered. In time, the memory capacity of the EPROM, typically 32 kilobytes to 10 megabytes, will be fully consumed. This type of memory would be satisfactory for the hand-held reader.

The non-volatile memory in the card reader can be removable by a user of the card reader. When it is removable, the user can remove either separate non-volatile memory or the sound chip. When a removable non-volatile memory is employed, it can be replaced with other non-volatile memory devices containing another group or series of prerecorded messages. When the non-volatile memory is removable, it can be constructed to detachably plug into a circuit board of the invention. Many constructions for removable memory are known to the skilled artisan, and all such embodiments are contemplated herein.

The non-volatile memory will be able to retain numerous independent uniquely addressed messages where each message can be associated with a particular activation code embodied in the encoded information disposed on a tag. The prerecorded message in the non-volatile memory can be any audible sound or combination of sounds. The encoded information need not be associated with the product.

Optionally the apparatus additionally includes either an actuatable randomizing switch which, when actuated, causes the playback means to playback a randomly selected recorded sound from the memory. Of course, the actuatable randomizing switch can be software stored in the memory or in the controller or in a sound chip.

The apparatus may further include a volume control to alter the level of selected sounds during playback of sounds recorded in the memory.

The hand-held reader advantageously has a tag-reading device operative to receive a wireless signal transmitted or read from the tag. The electro-optical tag-reading unit of the invention will be capable of sensing and reading encoded information borne by a tag. In one embodiment, the electro-optical reading unit will be disposed in close proximity to a slot on the hand-held card reader, wherein the slot is adapted to receive the tag. Then the electro-optical reading unit will be disposed in such a manner as to permit reading of the encoded information from a tag when said tag is properly placed within slot or associated recess.

In another embodiment, the electro-optical reading unit will comprise an antenna or a light emitter and reflector so that the tag can be read while between about 0 to about 5 inches, say about 0.5 to about 1.5 inches, from the reader.

The electro-optical reading unit can comprise one or more electro-optical sensors. In a preferred embodiment, electro-optical reading unit will comprise a bank of electro-optical sensors and will be able to read encoded information from a card either by sequentially scanning portions of the encoded information or by momentarily scanning all of the information at once. For example, the hand-held reader, comprising a minimal number of electro-optical sensors, can be used to scan encoded information on a tag as the tag is slid into slot to its final proper position. In an alternative embodiment, the hand-held reader will comprise numerous electro-optical sensors which will read all of the encoded information on a card simultaneously after the card has been properly seated within slot and electro-optical reading unit has been activated.

The electro-optical reading unit can be responsive to light in the human eye visible and invisible wavelength ranges. Thus, the present invention contemplates that electro-optical reading unit will be able to operate in the ultra-violet, visible, near infrared, normal infrared and far infrared wavelength ranges. It can also be responsive to fluorescent or phosphorescent light sources, or to magnetic sources, or to radio waves, or to microwaves, or to other electromagnetic frequency ranges.

In a preferred embodiment, the tag must be within about 1 to 5 centimeters, and preferably within about 3 centimeters, to be read by, and/or to activate, the reader.

The control unit of the invention is operably connected to electro-optical reading unit, sound generating unit, activating switch and power source. The control unit can comprise any commercially available microprocessor which will operate the card reader and associated components as described herein.

In addition, in a construction of the present invention, a separate activation switch is employed for activating the tag reading device to audibly enunciate the particular message corresponding to the model or type of toy which has been interfaced with the system. Although immediate delivery of a message upon placement of a particular model or type of toy on this system can be provided, a separate activation trigger switch may be used in order to assure that the entire identifying code has been transmitted to the system before the message is delivered.

The sensory output devices may comprise, for example one or more of the following: a speaker for auditory stimulation; a liquid crystal display or other display for showing text and/or pictures, a microswitch sensor for other purposes; a motor or the like for touch and movement stimulation; or a light. In some embodiments, the sensory output must be further processed by, for example, a computer to be observed by the consumer.

It is envisioned that some messages may be directly or indirectly, i.e., by typing, input into a personal computer with internet access. The message from the reader is then further processed by the internet site and the message is conveyed back to the consumer via the consumer's computer. The message in this embodiment may be instructions or an entrance for a game or contest or other marketing event.

Examples of actions which the reader-toy may perform include the following: move a portion of the toy; move the entire toy; produce a sound, which may comprise one or more of the following: a recorded sound, a synthesized sound, music including recorded music or synthesized music, speech including recorded speech or synthesized speech; display text or other pictures; and/or activate a light or other electrical switch. The received signal may comprise a condition governing the action as, for example, the duration of the action, or the number of repetitions of the action.

The housing of the hand-held card reader can be shaped as desired. The housing of the hand-held card reader can be shaped in the form of any person, place, aspect or thing and its shape is preferably associated with an aspect of a tag and packaging being read by a respective hand-held reader. Thus, either the shape or appearance of either a portion of the housing or the entire housing can be associated with some aspect of the tag being read.

It is also contemplated that either a portion of or the entire housing of the reader can be configured so as to completely or partially assume the form of or resemble an aspect, person, place or thing associated with the product on which the tag is or was attached to the wrapping. A wide variety of toys can be constructed employing the unique features of this invention. As an example, toy groups or classes such as cars, dolls, stuffed animals, trucks, airplanes, action figures, etc., can effectively employ the present invention. Each of these groups contain a plurality of types or models. In order to implement one embodiment of this invention, each type or model in the group has a specially designated, unique message created for that model which would relate to the attributes, characteristics, or qualities of that particular model. In this way, greater personalized information about each type or model of toy in a group or class of toys can be enjoyed by children to a substantially greater extent, since children will now obtain factual information or relevant insights into the habits, likes, or dislikes of the doll or stuffed animal or other toy with which the child is playing.

One aspect of the present invention comprises, in combination, a tag associated with food packaging and a talking hand-held reader toy. This invention comprises, in combination: a tag bearing encoded information adhering to food packaging that is also a toy, and a hand-held reader toy for reading encoded information disposed within a tag on a food package, said toy comprising: a housing having a portion configured to fit near the tag; a sound chip comprising a non-volatile memory for storing a prerecorded message associated with encoded information; a sound generating unit for audible play-back of a prerecorded message; optionally an electro-optical reading unit disposed adjacent the portion of said housing configured to fit near the tag; an activating switch for initiating operation of said talking hand-held toy; and a control unit operably connected to said sound generating unit, said electro-optical reading unit, said sound chip and said activating switch for decoding encoded information disposed within the tag, for retrieving from said non-volatile memory a prerecorded message associated with encoded information, and for initiating play-back of a prerecorded message by said sound generating unit. The hand-held reader toy may or may not be associated with the product.

One aspect of the invention provides an interactive toy comprising: a tag disposed on food packaging having a substantially planar portion bearing encoded information; and a reader comprising: a housing having a surface defining a receptacle for said tag, the housing being configured to resemble an aspect associated with said product; a sound chip comprising a non-volatile memory for storing a prerecorded message associated with the encoded information borne by said tag; a sound generating unit disposed within the housing for audible play-back of the prerecorded message associated with the encoded information borne by said tag; an electro-optical reading unit disposed adjacent the surface defining a receptacle in said housing for reading the encoded information on said tag; a control unit disposed within the housing and operably connected to said sound generating unit, said electro-optical reading unit, and said sound chip for decoding encoded information read by said electro-optical reading unit, for retrieving from said non-volatile memory the prerecorded message associated with the encoded information borne by said tag and read by said electro-optical reading unit, and for initiating play-back of the prerecorded message by said sound generating unit; and an activating switch associated with said housing and operably connected to said control unit.

It is contemplated that a wide variety of interchangeable or equivalent electronic components can be used, where appropriate, in place of the electronic components described herein.

The hand-held reader toy is provided separate or separable from the food packaging.

The reader and sensory output device are constructed for easily, separately interfacing with each of the different models or types of reader toys in that particular group or class. In one embodiment, each model or type has a unique identifying code associated therewith. The reader in this instance also reads the unique identifying code of the particular model, and processes the code information to deliver the precise message associated with that model. In this way, when activated, the reader provides a particular, specially designated message relating to the particular model or type of toy the child has selected or to characteristics of the consumer, for example, different languages.

The circuitry of hand-held card reader will vary according to whether or not a removable non-volatile memory is used and the individual electronic components used in the card reader. The circuitry will also vary according to the number of electro-optical sensors employed. The layout of one or of plural electro-optical sensors will determine the design of corresponding circuit board upon which the sensors are mounted and the construction of a tag which can be read by the reader.

One embodiment of the present invention is an interactive system providing a voice, sound, light, movement, or combination thereof when interacted with a given tag, wherein the voice, sound, light, movement, or combination thereof is different for different tags. The system comprises a tag bearing encoded information, either visual, electromagnetic, magnetic, or relief, and a talking hand-held reader for reading the encoded information and playing back an audible message associated with the image or encoded information.

In another embodiment, the present invention is an interactive system comprising, in combination: a tag bearing encoded information affixed to an ice cream package; and a talking, hand-held, single component tag reader comprising: a housing having a surface for receiving said tag; optionally a sound chip comprising a non-volatile memory for storing a prerecorded message associated with the image or encoded information borne by said tag; a motor capable of imparting movement to the toy, optionally a sound generating unit disposed within the housing for audible play-back of the prerecorded message associated with the image or encoded information borne by said tag; an electro-optical reading unit disposed adjacent the surface for reading the encoded information on said tag; a control unit disposed within the housing and operably connected to said motor and/or sound generating unit, a control unit for initiating play-back of the movement from the motor and/or prerecorded message by said sound generating unit; and an activating switch associated with said housing and operably connected to said control unit.

In operation, the reader may be powered up before or when a card bearing encoded information is placed within slot or along-side the hand-held reader and the activating switch is momentarily depressed. In one embodiment, the control unit is initialized and an internal timer is started. Electro-optical reading unit is then activated, and the encoded information is read. The information is decoded by control unit by determining the address of a particular memory segment in the non-volatile memory of sound chip that should be accessed. The internal timer is then reset to control duration of play-back of a recorded message. Sound generating unit is activated, and the appropriate message stored in the corresponding non-volatile memory segment in sound chip is played until the first of either time limit expiration or message completion occurs. The toy then powers down until next use.

The above is a detailed description of particular embodiments of the invention. Those with skill in the art should, in light of the present disclosure, appreciate that obvious modifications of the embodiments disclosed herein can be made without departing from the spirit and scope of the invention.

We claim:

1. A food product for delivering an audible, visual or tactile message to a consumer of the food product, comprising:
    a food packaging component;
    a tag having encoded information associated with the food packaging component; and
    a separate reader for translating the encoded information into the audible, visual or tactile message, such that before, during or after consuming the food product, the consumer may obtain the message from the encoded information of the tag by activating the reader to read the tag;
    wherein the reader comprises an antenna, and wherein the tag comprises a chip and an antenna.

2. The food product of claim 1 further comprising a sensory output mechanism providing one or more of text, light, sound, or movement when the reader is activated to read the encoded information.

3. The food product of claim 2 wherein the sensory output mechanism comprises:
    a sound chip that includes a memory for storing a prerecorded message associated with the encoded information;
    a sound-generating unit for audible play-back of the prerecorded message associated with the encoded information; and
    a mechanism for retrieving from the memory the prerecorded message associated with the encoded information.

4. The food product of claim 2 wherein the sensory output mechanism comprises:
    a memory for storing a prerecorded message associated with the encoded information;
    a text-generating unit for visual display of the prerecorded message associated with the encoded information; and
    a mechanism for retrieving from the memory the prerecorded message associated with the encoded information.

5. The food product of claim 1 wherein the reader can obtain the encoded information from the tag at a distance of up to about 5 centimeters.

6. The food product of claim 1 wherein the reader further comprises a sound chip and a speaker.

7. The food product of claim 1 wherein the food packaging component comprises a stick, cone, cup, or tube attached to, integral with, or contained within the packaging component, and wherein the tag is attached to the stick, cone, cup, or tube.

8. The food product of claim 1 wherein the tag is affixed to the food packaging component and releases no toxic compounds which may cause injury if ingested.

9. The food product of claim 1 wherein the tag is affixed to the food packaging component contains no metal of a quantity sufficient to set off a food metal detector.

10. The food product of claim 1 further comprising a plurality of tags and a plurality of different food packaging components, wherein a different tag is associated with each different food packaging component so that the reader provides a different message for each tag.

11. The food product of claim 1 which further comprises a wrapper wherein the tag is disposed upon or affixed to the wrapper.

12. The food product of claim 1 which further comprises a box for containing a plurality of food products wherein an additional tag is associated with the box.

13. The food product of claim 12 in the form of an ice cream product having a stick or wrapper or both, wherein the tag is associated with either the stick, the wrapper or both.

14. The food product of claim 1 wherein the separate reader is a point-of-sale device.

15. The food product of claim 2 wherein the sensory output includes text, a voice, or both, wherein the messages are stored in a plurality of languages, and wherein the reader comprises a controller to select the language for sensory output.

16. The food product of claim 1, wherein the information is stored on the tag chip, the tag antenna is configured for transmitting the information from the chip, and the reader antenna is configured for receiving the transmitted information.

17. The food product of claim 1, wherein the packaging element comprises an ice cream stick, and the food product comprises ice cream.

18. The food product of claim 1, further comprising:
    a housing that houses the reader; and
    an activation element associated with the reader for activating the reader when in contact with the food packaging component.

19. The food product of claim 18, wherein:
    the housing defines an opening configured for receiving the packaging component; and
    the activation element comprises a switch positioned and configured for activation by the packaging component received in the opening.

20. The food product of claim 1, wherein the encoded information comprises the message in encoded form.

21. The food product of claim 1, further comprising a housing that houses the reader and that is configured as a child's toy, wherein the message corresponds to the characteristics of the type of said toy.

22. The food product of claim 21, further comprising a sensory output mechanism including a speaker, where in the message comprises a sound corresponding to said type of toy.

23. A food product system for delivering a message to a consumer of the food product, comprising:
- a food packaging component;
- a tag associated with the food packaging component and comprising encoded information that includes a message in encoded form;
- a housing separate from the food packaging component; and
- a reader connected to the housing and configured for translating the encoded information into the message, such that before, during or after consuming the food product, the consumer may obtain the message from the encoded information of the tag by activating the reader to read the tag.

24. The food product of claim 23, wherein the reader comprises at least one electro-optical sensor capable of reading encoded information on the tag by one or more of visible, ultraviolet and infrared light, by conductivity, or by magnetic field.

25. The food product of claim 24, wherein the reader comprises a plurality of electro-optical sensors, wherein the housing is configured as a child's toy, and the message corresponds to the characteristics of the type of said toy.

26. The food product of claim 24, wherein the reader is configured for reading the encoded information on the tag by one or more magnetic switches, the tag is at least partially magnetized, and the housing defines a slot adapted to receive at least a portion of the food packaging component.

27. The food product of claim 23, wherein the packaging element comprises an ice cream stick, and the food product comprises ice cream.

28. A food product system for delivering a message to a consumer of the food product, comprising:
- a food packaging component;
- a tag associated with the food packaging component and comprising encoded information;
- a housing separate from the food packaging component and comprising a movable portion;
- a reader connected to the housing and configured for translating the encoded information into the message, such that before, during or after consuming the food product, the consumer may obtain the message from the encoded information of the tag by activating the reader to read the tag;
- a motor connected to the housing and operably associated for moving the movable portion; and
- a sensory output mechanism connected to the housing and configured for actuating the motor to move the movable portion in response to and depending on the translated message.

29. The food product of claim 28, wherein the housing is configured as a child's toy, wherein the actuating portion and the message are configured for moving the housing corresponding to the characteristics of the type of said toy.

* * * * *